3,124,413
METHOD OF MAKING ESSENTIALLY COLORLESS, PARTIALLY HYDROLYZED, DYE RECEPTIVE ACRYLONITRILE POLYMERS
Fred J. Lowes, Midland, Mich., assignor to The Dow Chemical Company, Midland, Mich., a corporation of Delaware
No Drawing. Filed May 29, 1961, Ser. No. 113,135
4 Claims. (Cl. 8—115.5)

This invention relates to a method for partial hydrolysis of polymeric forms of acrylonitrile and for the decolorization of the partially hydrolyzed product, to provide an essentially colorless product which can be dyed readily, as with basic dyes. The polymeric materials susceptible to advantageous treatment according to the invention include not only the homopolymer of acrylonitrile, but also linear copolymers at least 80 percent of the repeating units of which are

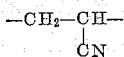

It is well known that homopolymeric acrylonitrile and the linear copolymers of at least 80 percent acrylonitrile with other monoethylenic polymerizable substances are highly hydrophobic, and that fibers made from them are less easily dyed than most other fibers, whether natural or synthetic. The principal reason for using copolymers of acrylonitrile instead of the homopolymer has been that chemically active, dye receptive groups can be incorporated in a copolymer. Even so, the products are hydrophobic and dyeing has required special techniques or has been possible only with special dyes. In short, there remains room for further improvement.

It is also known that polymeric forms of acrylonitrile can be converted, by alkaline hydrolysis, to polyacrylic acid compounds. If the hydrolysis is carried far enough, the product becomes completely soluble in aqueous media and is no longer useful for producing textile fibers of present commercial interest. The known alkaline hydrolysis is accompanied by a prompt and highly undesirable color transition, usually through yellow to orange and red colors. Even if the so-treated polymer were still capable of forming filaments of satisfactory strength and flexibility, the discoloration which arose from the alkaline hydrolysis would make them wholly unacceptable.

It would be desirable to provide a simple treatment whereby the homopolymer of acrylonitrile, or linear copolymers of acrylonitrile which normally have the characteristics of polyacrylonitrile, may be partially hydrolyzed and treated so as to be essentially colorless, readily dyeable with basic dyes, and possessed of the physical characteristics desired in textile fibers. The provision of such a treatment is the principal object of this invention.

The treatment of the present invention, whereby the foregoing and related objects are attained, is a method in which a normally hydrophobic polymeric article, such as a filament or film, at least 80 percent of the repeating units of which are

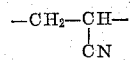

is exposed to the action of aqueous alkaline agent, selected from the group consisting of the alkali metal hydroxides and ammonium hydroxide, of 20 or more weight percent concentration only until the article acquires both a yellow discoloraiton and a slippery surface, removing the article from the alkaline medium, washing it in fresh water to remove adherent alkali, and, then immersing it in dilute aqueous non-alkaline oxidizing bleach from the class consisting of hydrogren peroxide, chlorine water and bromine water for a period of time sufficient to effect decolorization. The time required for each step is inversely related to the temperature employed. Each step can usually be completed in 5 to 30 minutes at room temperature, or, with the same reagents in from 15 seconds to 3 minutes at 60° C. The resulting product is essentially colorless, is highly flexible, and is readily dyeable, especially with basic dyes.

The treatment may be applied to any article made of the predominately acrylonitrile polymeric materials, as it renders the surfaces of such articles less hydrophobic and more readily dyeable. It is of special benefit to those thin articles such as fibers and films, as it provides such articles additionally with improved flexibility. The greatest problem exists, and the greatest benefit is realized from the treatment, with the homopolymer of acrylonitrile. The copolymers of acrylonitrile with up to 20 percent of one or a plurality of other monoethylenic monomers, as is known in the art, share the principal characteristics of polyacrylonitrile. By way of illustration, but not of limitation, such known copolymers include those in which acrylonitrile is copolymerized with a minor (not exceeding 20 percent in the aggregate) proportion of one or a mixture of vinyl acetate, methyl acrylate, methacrylonitrile, acrylamide, methacrylamide, allyl alcohol, acrylic acid, itaconic acid, fumaronitrile, 2-vinylpyridine, ethylene sulfonic acid and its alkali metal salts, vinylbenzene sulfonic acid and its alkali metal salts, the vinyl lactams such as vinyl caprolactam, maleic anhydride, and others known in the art. Not all such copolymers are as hydrophobic or as difficult to dye as is the homopolymer, but they all can be improved further by the method of the present invention.

The alkaline agent employed may be KOH, NaOH, LiOH, CsOH or NH$_4$OH. To be effective in a reasonable time, the solution employed should have a concentration at least of the order of 20 percent by weight. Concentrated ammonium hydroxide, commercially available at 27 to 29 percent concentration is convenient for the purpose, though aqueous sodium or potassium hydroxides of 20 to 45 percent concentrations are generally preferred.

While the invention is not limited to the treatment of foils, fibers and similarly thin, flexible articles, it finds particular advantages with such materials. It is applicable to such articles regardless of the manner in which they were prepared. Thus, films or sheets may be treated which were produced by molding or extrusion, or by being cast from solution or emulsion, or by being coagulated from solution by contact with a non-solvent for the polymer which is miscible with the solvent. Similarly, fibers and filaments may be treated which have been wet spun or dry spun from organic solvents or have been wet spun from known aqueous strong salt solutions and thus coagulated as filamentary aquagel, as is known in the art. When films or filaments are first formed as an aquagel, the present treatment may be applied while the gel condition is retained, or it may be applied after the article has been so thoroughly dried as irreversible to destroy the aquagel condition.

In an illustrative practice of the invention, a thin film of polyacrylonitrile was immersed in a solution of 30 percent by weight of potassium hydroxide in water at 25° C. After ten minutes the film had become dark yellow, and its surface was slippery. It was removed from the alkali and washed thoroughly with fresh running water for about 30 seconds. It retained considerable yellow discoloration. The film was then immersed in 3 percent aqueous hydrogen peroxide at 25° C., and soon became colorless. It was removed, rinsed in water, and dried. It had the same transparency and freedom from color as the original untreated film, but had greater flexibility when wet. Samples of the treated and untreated films were immersed for the same length of time in the same dye bath containing Sevran Brilliant Red 4G (Colour Index Basic Red 14) under standard dyeing conditions. The untreated specimen was only superficially dyed, and only to a light shade, while the specimen treated in accordance with the present invention was dyed throughout to a deep shade.

In like manner, tows of continuous filament acrylonitrile polymer have been treated in 20 or 40 percent NaOH, 20 or 28 percent NH$_4$OH, or 20 or 40 percent KOH until discoloration and surface slipperiness indicate the occurence of partial hydrolysis, and, after rinsing, they have been exposed to 3 or 6 percent hydrogen peroxide, or to 4 or 8 percent HOCl·HCl, or to 3 or 7 percent HOBr·HBr until decolorized. The resulting filaments have been found to be readily dyeable, and to have both wet and dry tenacity values well within the normal range for the conventional, untreated "acrylic" fibers.

The alkaline partial hydrolysis step of the present invention must be terminated when the yellow discoloration and the slimy surface have both appeared. Otherwise, hydrolysis continues and yields progressively weakened articles, probably due to macromolecular scission, and finally produces polyacrylic acid, soluble in water or alkalies.

I claim:

1. The method which comprises immersing an article consisting essentially of a linear polymer of which at least 80 percent of the recurring units are $$-CH_2-CH-$$
$$|$$
$$CN$$

and which when dried is normally hydrophobic, in an aqueous alkaline agent selected from the class consisting of alkali metal hydroxides and ammonium hydroxide, of at least 20 weight percent concentration only until the article acquires both a yellow discoloration and a slippery surface, rinsing the article in water to remove adherent alkali, and immersing it until decolorized in an aqueous non-alkaline oxidizing bleach from the class consisting of hydrogen peroxide, chlorine water and bromine water.

2. The method claimed in claim 1, wherein the article is a filamentary form of polyacrylonitrile.

3. The method claimed in claim 2, wherein the alkaline agent is an alkali metal hydroxide solution of from 20 to 40 weight percent concentration.

4. The method claimed in claim 3, wherein the bleach is aqueous hydrogen peroxide.

References Cited in the file of this patent
UNITED STATES PATENTS

| | | |
|---|---|---|
| 2,432,448 | Richard | Dec. 9, 1947 |
| 2,700,034 | Zybert | Jan. 18, 1955 |
| 2,916,348 | Cresswell | Dec. 8, 1959 |
| 2,936,211 | Kocay et al. | May 10, 1960 |